(No Model.)
F. DIETZ.
LANTERN GLOBE SUPPORT.
No. 346,095. Patented July 27, 1886.
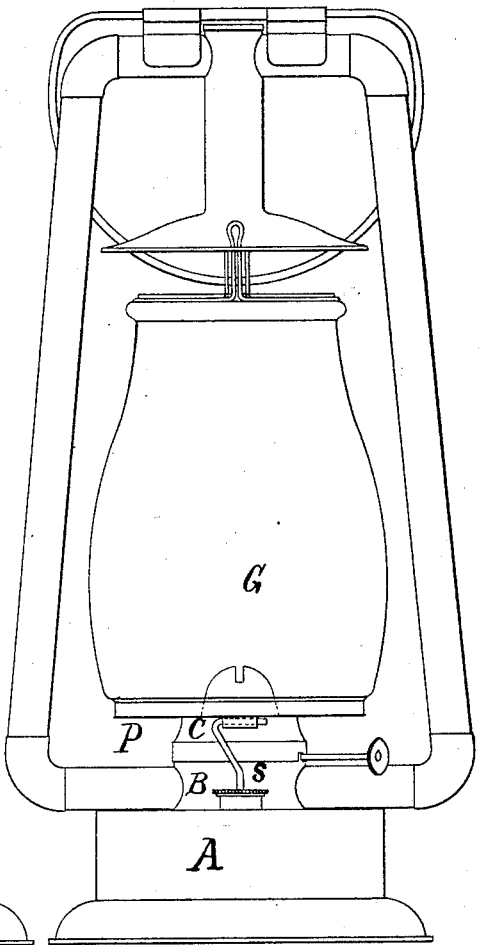
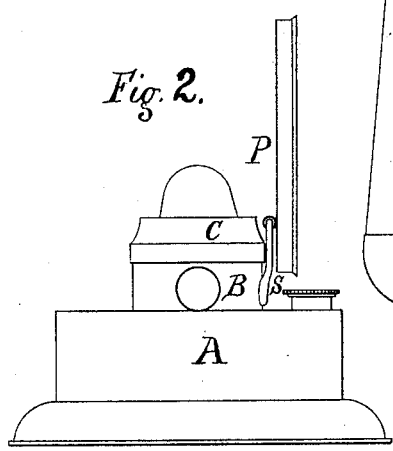
WITNESSES:-
Wm H Weightman
Edwd Ball
INVENTOR:-
F. Dietz.
By A. M. Pierce.
Atty.

UNITED STATES PATENT OFFICE.

FREDERICK DIETZ, OF NEW YORK, N. Y.

LANTERN GLOBE-SUPPORT.

SPECIFICATION forming part of Letters Patent No. 346,095, dated July 27, 1886.

Application filed July 21, 1885. Serial No. 172,227. (No model.)

*To all whom it may concern:*

Be it known that I, FREDERICK DIETZ, a citizen of the United States, and a resident of New York, in the county of New York and State of New York, have invented certain new and useful Improvements in Lantern Globe-Supports, of which the following is a specification.

My invention relates especially to means for removably securing the globe-supporting plate upon lanterns, and has for its object the provision of a removable hinged globe-support cheap and simple to construct and easy to operate.

The invention consists, essentially, in an arm or standard secured to the base of the lantern, extending upward at one side of the air-chamber and burner-cone, in combination with a tube or thimble secured to or formed upon the globe-supporting plate, said tube encircling the arm upon the standard in such a manner as to permit the tilting or tipping of the globe-supporting plate and the removal of said plate from the standard at will, all of which will be hereinafter first fully described, and then pointed out in the claim.

In the drawings, Figure 1 is a front elevation of a lantern wherewith my device is employed; and Fig. 2 is a side view of the base of the lantern, showing the globe supporting plate as tipped back.

Like letters of reference, wherever they occur, indicate corresponding parts in both figures.

A is the base of the lantern.
B is the air-chamber.
C is the burner-cone.
G is the globe supported upon a plate, P, which finds a seat upon the burner-cone.
S is a standard secured to the base of the lantern, the upper portion of the standard being bent parallel with the plate P, as plainly shown in Fig. 1.

T is a tube secured to the under side of plate P, or formed by the metal thereof, adapted and arranged to embrace the horizontal arm of the standard S. In placing the plate in position the plate is held as shown in Fig. 2, and the arm passed through the tube, when the plate may be turned down upon the cone.

When constructed and arranged in accordance with the foregoing description, my improved removable hinged globe-supporting plate will be found admirably adapted to the uses and purposes for which it is intended, as it will not slip from place when tilted upward, and can be instantly removed when desired, and manipulation of the globe and plate for reaching the burner is greatly facilitated.

I have made application of even date herewith (Serial No. 172,228) for a patent for an improvement in lantern globe-supports, the globe-supporting plate being fixed to the supporting-yoke, whereas in my present application it is removable, and so far as said device shown and described in said application is similar to my present application, I make no claim herein; but,

Having now fully described my invention, what I claim as new therein, and desire to secure by Letters Patent, is—

The combination, with an oil-reservoir and burner of a lantern, of a standard secured to said reservoir and provided with a horizontal arm, and a removable globe-supporting plate provided with a tube encircling the arm upon the standard, substantially as and for the uses and purpose shown and described.

Signed at New York, in the county of New York and State of New York, this 11th day of June, A. D. 1885.

FREDERICK DIETZ.

Witnesses:
W. J. MORGAN,
A. M. PIERCE.